(12) United States Patent
Kozaki et al.

(10) Patent No.: US 8,042,880 B2
(45) Date of Patent: Oct. 25, 2011

(54) AUTOMOBILE WHEEL

(75) Inventors: Akiyoshi Kozaki, Anjo (JP); Takumitsu Nakamura, Anjo (JP)

(73) Assignee: Central Motor Wheel Co., Ltd., Anjo-Shi, Aichi-Ken (JP)

( * ) Notice: Subject to any disclaimer, the term of this patent is extended or adjusted under 35 U.S.C. 154(b) by 0 days.

(21) Appl. No.: 12/709,761

(22) Filed: Feb. 22, 2010

(65) Prior Publication Data

US 2010/0213756 A1 Aug. 26, 2010

(30) Foreign Application Priority Data

Feb. 25, 2009 (JP) ................................. 2009-042711

(51) Int. Cl.
*B60B 3/04* (2006.01)

(52) U.S. Cl. .............................. 301/63.107; 301/63.101

(58) Field of Classification Search ............. 301/63.101, 301/63.103, 63.107; 29/894.32, 894.322, 29/894.323, 894.325
See application file for complete search history.

(56) References Cited

U.S. PATENT DOCUMENTS

| | | | | |
|---|---|---|---|---|
| 2,133,144 A | * | 10/1938 | Johnson | 29/894.325 |
| 2,840,422 A | * | 6/1958 | Main et al. | 301/63.104 |
| 3,627,382 A | * | 12/1971 | Lejeune | 301/63.108 |
| 5,951,114 A | * | 9/1999 | Marron et al. | 301/63.101 |
| 6,332,653 B1 | * | 12/2001 | Shimizu et al. | 301/63.101 |
| 6,726,291 B2 | * | 4/2004 | Vaxelaire et al. | 301/63.107 |
| 6,839,967 B2 | * | 1/2005 | Abe et al. | 29/894.325 |
| 2002/0007556 A1 | * | 1/2002 | Marron et al. | 29/894.325 |

FOREIGN PATENT DOCUMENTS

| | | | | |
|---|---|---|---|---|
| JP | 2001180202 A | * | 7/2001 | |
| JP | 2002187402 A | * | 7/2002 | |
| JP | 2008114723 A | * | 5/2008 | |

* cited by examiner

*Primary Examiner* — Kip T Kotter (74) *Attorney, Agent, or Firm* — McDermott Will & Emery LLP (57) ABSTRACT

An automobile wheel having a wheel di.sk with improved stiffness and increased strength and driving stability. An imaginary inward angled line is tangential to an inner circumferential surface of an inward recessed circumferential portion of a hat portion and tangential to an inner circumferential surface of a hub surface rounded portion of a hub mounting portion. An imaginary outward angled line is tangential to an inner circumferential surface of an outward recessed circumferential portion of the hat portion and runs through an intersection point of a disk flange and an imaginary bottom line. The imaginary bottom line extends along a back side surface of the hub mounting portion. The imaginary inward and outward angled lines satisfy a ratio of an imaginary outward angle to an imaginary inward angle of equal to or greater than 0.8 to equal to or smaller than 1.25 with respect to the imaginary bottom line.

1 Claim, 5 Drawing Sheets

| | Hub surface diameter (mm) | Fit diameter (mm) | Hat top diameter (mm) | Imaginary inward angle (α) (degree) | Imaginary outward angle (β) (degree) | (β)/(α) | Deviation distance (t) (mm) | Displacement (δ) (mm) | Weight (kg) | δ×Weight (mm·kg) |
|---|---|---|---|---|---|---|---|---|---|---|
| Comparative Example 1 | φ133.5 | φ364.6 | φ233 | 47.9 | 35.6 | 0.74 | 3.2 | 2.47 | 9.63 | 23.8 |
| Comparative Example 2 | | | φ237 | 46.4 | 36.7 | 0.79 | 2.9 | 2.41 | 9.64 | 23.2 |
| Example 1 | | | φ241 | 44.9 | 37.8 | 0.84 | 2.5 | 2.36 | 9.64 | 22.8 |
| Example 2 | | | φ245 | 43.4 | 39.0 | 0.90 | 2.1 | 2.32 | 9.65 | 22.4 |
| Example 3 | | | φ249 | 41.9 | 40.2 | 0.96 | 1.5 | 2.30 | 9.66 | 22.2 |
| Example 4 | | | φ253 | 40.4 | 41.5 | 1.03 | 0.9 | 2.29 | 9.67 | 22.1 |
| Example 5 | | | φ257 | 38.8 | 42.9 | 1.11 | 0.1 | 2.30 | 9.68 | 22.3 |
| Example 6 | | | φ261 | 37.3 | 44.4 | 1.19 | 0.7 | 2.34 | 9.70 | 22.7 |

AUTOMOBILE WHEEL

CROSS-REFERENCE TO PRIOR APPLICATIONS

Priority is claimed to Japanese Patent Application No. 2009-042711, filed on Feb. 25, 2009, which is hereby incorporated by reference in its entirety herein.

FIELD OF THE INVENTION

The present invention relates to an automobile wheel that includes: a wheel disk that is connected to an axle; and a wheel rim on which a tire is mounted, in which the wheel disk is engaged with an inner circumferential surface of the wheel rim to join the wheel disk and the wheel rim together.

BACKGROUND

For example, a typical automobile wheel made of steel includes: a substantially disk-shaped wheel disk; and a substantially cylindrical wheel rim. The wheel disk includes: a hub mounting portion that is connected to a hub of an axle; a hat portion that bulges from an outer circumferential edge of the hub mounting portion toward a surface side direction; and a disk flange that extends from an outer circumferential edge of the hat portion toward a back side direction. The hub mounting portion, the hat portion, and the disk flange are arranged concentrically. The wheel disk is engaged with an inner circumferential surface of the wheel rim to be welded to the wheel rim together into one piece. The hat portion of the wheel disk offers desired stiffness. The hat portion of the desired stiffness is very effective in minimizing deformation of the wheel disk due to various loads that are imposed during car driving. Thus, the wheel disk offers high overall strength. Particularly, under lateral force loading on the car during driving, a bending moment acts on the wheel disk. The bending moment is relatively large enough to bend the wheel disk in a surface side to back side direction. The hat portion offers high stiffness for the bending moment and minimizes the deformation of the wheel disk. This allows the automobile wheel to offer high strength and to provide increased driving stability.

Such automobile wheel is proposed in, for example, as described in Japanese Unexamined Patent Publication No. 2001-180202 ("JP '202"). In JP '202, the hat portion includes: an inward angled circumferential portion; an outward angled circumferential portion; and a hat top circumferential portion. The inward angled circumferential portion includes: an inward protruding circumferential portion that is curved toward the surface side; and an inward recessed circumferential portion that is curved toward the back side. The outward angled circumferential portion includes an outward recessed circumferential portion that is curved toward the back side. The hat top circumferential portion protrudes toward a surface side direction between the outward angled circumferential portion and the inward angled circumferential portion. In the automobile wheel of the aforementioned construction, the hat portion is formed into the shape described to allow the automobile wheel to have high stiffness, and thus to offer high overall strength.

SUMMARY OF THE INVENTION

Problem to be Solved by the Invention

In recent years, there has been a strong demand for improving environmental performance of the car. Accordingly, requirements for characteristics of the automobile wheel, such as lighter weight and higher strength, are increasingly severe. This leads to a stronger demand for a further lighter and further stronger automobile wheel than the automobile wheel that has the conventional hat portion. In addition, as the car performance improves, there is a demand for further improving driving stability of the automobile wheel loaded with lateral force.

The present invention proposes an automobile wheel that has high strength and provides increased driving stability.

Means for Solving Problem

The present invention is directed to an automobile wheel that includes: a wheel disk; and a substantially cylindrical wheel rim, in which the wheel disk includes: a substantially disk-shaped hub mounting portion that is connected to a hub on an axle; a hat portion that bulges outward from the hub mounting portion toward a surface side direction; and a disk flange that extends from an outer circumferential edge of the hat portion toward a back side direction, and the wheel disk is engaged with an inner circumferential surface of the wheel rim to join the wheel disk and the wheel rim together. The hat portion includes: an inward angled circumferential portion that has a substantially S-shape cross section and that includes: an inward protruding circumferential portion; and an inward recessed circumferential portion, in which the inward protruding circumferential portion is formed continuously with an outer circumferential edge of a hub surface rounded portion and protrudes toward a surface side in a curved shape, the hub surface rounded portion is formed along an outer circumferential edge of the hub mounting portion and bends toward the surface side, and the inward recessed circumferential portion is formed continuously with an outer circumferential edge of the inward protruding circumferential portion and is recessed toward a back side in a curved shape; a hat top circumferential portion that is formed continuously with an outer circumferential edge of the inward recessed circumferential portion of the inward angled circumferential portion and that protrudes toward the surface side direction in a curved shape; and an outward angled circumferential portion that includes an outward recessed circumferential portion that is formed continuously with an outer circumferential edge of the hat top circumferential portion and that is recessed toward the back side in a curved shape. The inward angled circumferential portion, the hat top circumferential portion, and the outward angled circumferential portion are arranged concentrically. On a vertical cross section that includes a central axis of the wheel disk, when an imaginary inward angle ($\alpha$) is formed between an imaginary inward angled line L and an imaginary bottom line M, and an imaginary outward angle ($\beta$) is formed between an imaginary outward angled line N and the imaginary bottom line M, where the imaginary inward angled line L is tangential to an inner circumferential surface of the hub surface rounded portion and to an inner circumferential surface of the inward recessed circumferential portion of the inward angled circumferential portion, the imaginary bottom line M extends outward along a back side surface of the hub mounting portion, and the imaginary outward angled line N is tangential to an inner circumferential surface of the outward recessed circumferential portion of the outward angled circumferential portion and runs through an intersection point G of the imaginary bottom line M and an inner circumferential surface of the disk flange, the imaginary inward angle ($\alpha$) and the imaginary outward angle ($\beta$) satisfy an equation:

$$0.8 \leq (\beta)/(\alpha) \leq 1.25,$$

and when a radial deviation distance (t) is defined between an imaginary intersection point P and a top point O of the hat top circumferential portion, where the imaginary intersection point P is defined by the imaginary inward angled line L and the imaginary outward angled line N, the deviation distance (t) satisfies an equation:

$$0 \text{ mm} \leq (t) \leq 2.5 \text{ mm}.$$

The deviation distance (t) is an amount of deviation in a radial direction between the imaginary intersection point P, which is defined by the imaginary inward angled line L and the imaginary outward angled line N, and the top point O of the hat top circumferential portion. Therefore, the deviation distance (t) is represented as an absolute value.

A performance test or a rotary bending fatigue test (JIS D4103) was performed for the conventional automobile wheel (Japanese Unexamined Patent Publication No. JP2001-A-180202). In the test, the wheel disk of the conventional automobile wheel was deformed, and a break tended to start from the hub surface rounded portion that is formed along the outer circumferential edge of the hub mounting portion or from the recessed portion of the inward angled circumferential portion of the hat portion. In the rotary bending fatigue test, a bending moment (load) was applied to the automobile wheel in a surface side to back side direction to simulate the condition of lateral force loading on the car. The results of the rotary bending fatigue test show that due to the lateral force, a higher stress was imposed on the break start point. Therefore, the automobile wheel needs to be designed to reduce the stress to be imposed on the break start point. The present inventors found, as a consequence of devoting themselves to the study of the design for stress reduction, that as the hat portion exhibits a better stiffness balance between sides inward and outward from the hat top circumferential portion (the inward angled circumferential portion side and the outward angled circumferential portion side), the effect of minimizing the deformation of the wheel disk improves, accordingly reducing the stress to be imposed on the hub surface rounded portion and on the inward angled circumferential portion. It is conceivable that the reason for this is that the hat top circumferential portion of the hat portion has the highest stiffness among the wheel disk, and the better stiffness balance between the sides inward and outward from the hat top circumferential portion produces the effect of improving the overall stiffness of the wheel disk for a bending moment that is applied with the lateral force, and thus improves the effect of minimizing the deformation of the wheel disk.

The present invention is achieved based on these findings. In one aspect of the present invention, in order for the hat portion to exhibit a better stiffness balance between the inward angled circumferential portion side and the outward angled circumferential portion side, a ratio of the imaginary outward angle ($\beta$) to the imaginary inward angle ($\alpha$) is defined as equal to or greater than 0.8 to equal to or smaller than 1.25, while the deviation distance (t) between the imaginary intersection point P, which is defined by the imaginary inward angled line L and the imaginary outward angled line N, and the top point P of the hat top circumferential portion is defined as equal to or longer than 0 mm to equal to shorter than 2.5 mm. According to the aspect of the present invention, when a bending moment is applied in the surface side to back side direction under the condition of lateral force loading, the stress is caused due to the bending moment and is distributed in balance along the imaginary inward angled line L and the imaginary outward angled line N. This allows a force to withstand and support the bending moment (load) to be efficiently produced. Therefore, as the hat portion exhibits the better stiffness balance between the sides inward and outward from the stiffest hat top circumferential portion, the wheel disk has the higher overall stiffness. This improves the effect of minimizing the deformation of the wheel disk for the bending moment. According to the aspect of the present invention, a relationship between a radial position of the top point O of the hat top circumferential portion, a position of the inward recessed circumferential portion of the inward angled circumferential portion, and a position of the hub surface rounded portion of the hub mounting portion is determined based on the imaginary inward angled line L. A break tends to start from the inward recessed circumferential portion and the hub surface rounded portion. Thus, this relationship allows the stress concentration on the inward recessed circumferential portion and on the hub surface rounded portion to be relaxed by the effect of the better stiffness balance and the effect of minimizing the deformation of the wheel disk. This allows the automobile wheel to have high strength and high stiffness, and to have high stiffness for lateral force and thus provide increased driving stability. In addition, because the automobile wheel has high strength, the wheel disk can have a reduced thickness to reduce its weight.

If the ratio ($\beta$)/($\alpha$) is smaller than 0.8 or larger than 1.25, there is a stronger tendency that the hat portion loses the stiffness balance between the sides inward and outward from the top point of the hat top circumferential portion. This reduces the effect of minimizing the deformation of the wheel disk for a bending moment in the surface side to back side direction. Thus, the functional effects of the present invention are not sufficiently exhibited. Preferably, the relationship between the imaginary inward angle ($\alpha$) and the imaginary outward angle ($\beta$) is defined such that an imaginary triangle that is defined by the imaginary inward angled line L, the imaginary outward angled line N, and the imaginary bottom line M is as similar to an isosceles triangle as possible. As described above, this relationship allows the stress that is caused due to the bending moment to be distributed along the imaginary inward angled line L and the imaginary outward angled line N in balance as much as possible. This improves the functional effect of the better stiffness balance. The foregoing description that the imaginary triangle is as similar to an isosceles triangle as possible means that the ratio ($\beta$)/($\alpha$) is as closest to 1 as possible. Thus, preferably the relationship between the imaginary inward angle ($\alpha$) and the imaginary outward angle ($\beta$) is expressed as below:

$$0.84 \leq (\beta)/(\alpha) \leq 1.20.$$

More preferably, the relationship between the imaginary inward angle ($\alpha$) and the imaginary outward angle ($\beta$) is expressed as below:

$$0.9 \leq (\beta)/(\alpha) \leq 1.11.$$

Furthermore preferably, the relationship between the imaginary inward angle ($\alpha$) and the imaginary outward angle ($\beta$) is expressed as below:

$$0.95 \leq (\beta)/(\alpha) \leq 1.05.$$

This further allows the imaginary triangle to be as similar to an isosceles triangle as possible, and further improves the effect of the better stiffness balance.

In turn, if the deviation distance (t) between the imaginary intersection point P, which is defined by the imaginary inward angled line L and the imaginary outward angled line N, and the top point O of the hat top circumferential portion is longer than 2.5 mm, a radial position of the top point O of the stiffest hat top circumferential portion is more deviated from a radial position of the imaginary intersection point P. This leads to a stronger tendency that the hat portion loses the stiffness balance between the sides inward and outward from the top point O of the hat top circumferential portion, and accordingly the stress due to the bending moment in the surface side to back side direction acts unequally on the sides inward and outward from the top point O. This reduces the effect of minimizing the deformation of the wheel disk for the bending moment, and the functional effects of the present invention are not sufficiently exhibited. Preferably, the deviation distance (t) is defined as below:

$0 \text{ mm} \leq (t) \leq 1.5 \text{ mm}.$

This further improves the stiffness balance.

In the present invention, when a hub mounting surface is formed on a back side surface of the hub mounting portion and is brought into press contact with the hub of the axle, the imaginary bottom line M is preferably drawn extending outward along the hub mounting surface. Preferably, the hub mounting surface is formed on the back side surface of the hub mounting portion into a ring shape along the outer circumferential edge of the hub mounting portion.

Effect of the Invention

As described above, in the automobile wheel of the present invention, the hat portion includes: the inward angled circumferential portion; the hat top circumferential portion; and the outward angled circumferential portion. The inward angled circumferential portion has a substantially S-shape cross section and includes: the inward protruding circumferential portion; and the inward recessed circumferential portion, in which the inward protruding circumferential portion is formed continuously with the hub surface rounded portion, and the inward recessed circumferential portion is formed continuously with the inward protruding circumferential portion. The hat top circumferential portion protrudes toward the surface side direction in a curved shape. The outward angled circumferential portion includes the outward recessed circumferential portion that is formed continuously with the hat top circumferential portion. On the vertical cross section, the form of the hat portion is determined such that the imaginary inward angle (α) of the imaginary inward angled line L with respect to the imaginary bottom line M and the imaginary outward angle (β) of the imaginary outward angled line N with respect to the imaginary bottom line M satisfy $0.8 \leq (\beta)/(\alpha) \leq 1.25,$ where the imaginary inward angled line L is tangential to the inner circumferential surface of the hub surface rounded portion and to the inner circumferential surface of the inward recessed circumferential portion, the imaginary bottom line M extends outward along the back side surface of the hub mounting portion, and the imaginary outward angled line N is tangential to the inner circumferential surface of the outward recessed circumferential portion and runs through the intersection point G of the imaginary bottom line M and the disk flange, and such that the radial deviation distance (t) between the imaginary intersection point P and the top point O of the hat top circumferential portion satisfies $0 \text{ mm} \leq (t) \leq 2.5 \text{ mm},$ where the imaginary intersection point P is defined by the imaginary inward angled line L and the imaginary outward angled line N. This allows the stress that is caused due to the bending moment in the surface side to back side direction to be distributed in balance to the sides inward and outward from the top point O of the stiffest hat top circumferential portion. Thus, the hat portion exhibits increased stiffness balance. This improves the effect of minimizing the deformation of the wheel disk for the bending moment, and thus improves the overall strength of the automobile wheel. In addition, the wheel disk has high stiffness, and thus the automobile wheel provides improved driving stability with lateral force loading.

DETAILED DESCRIPTION

An embodiment of the present invention will be described below in detail with reference to the accompanying drawings.

Figure 1:
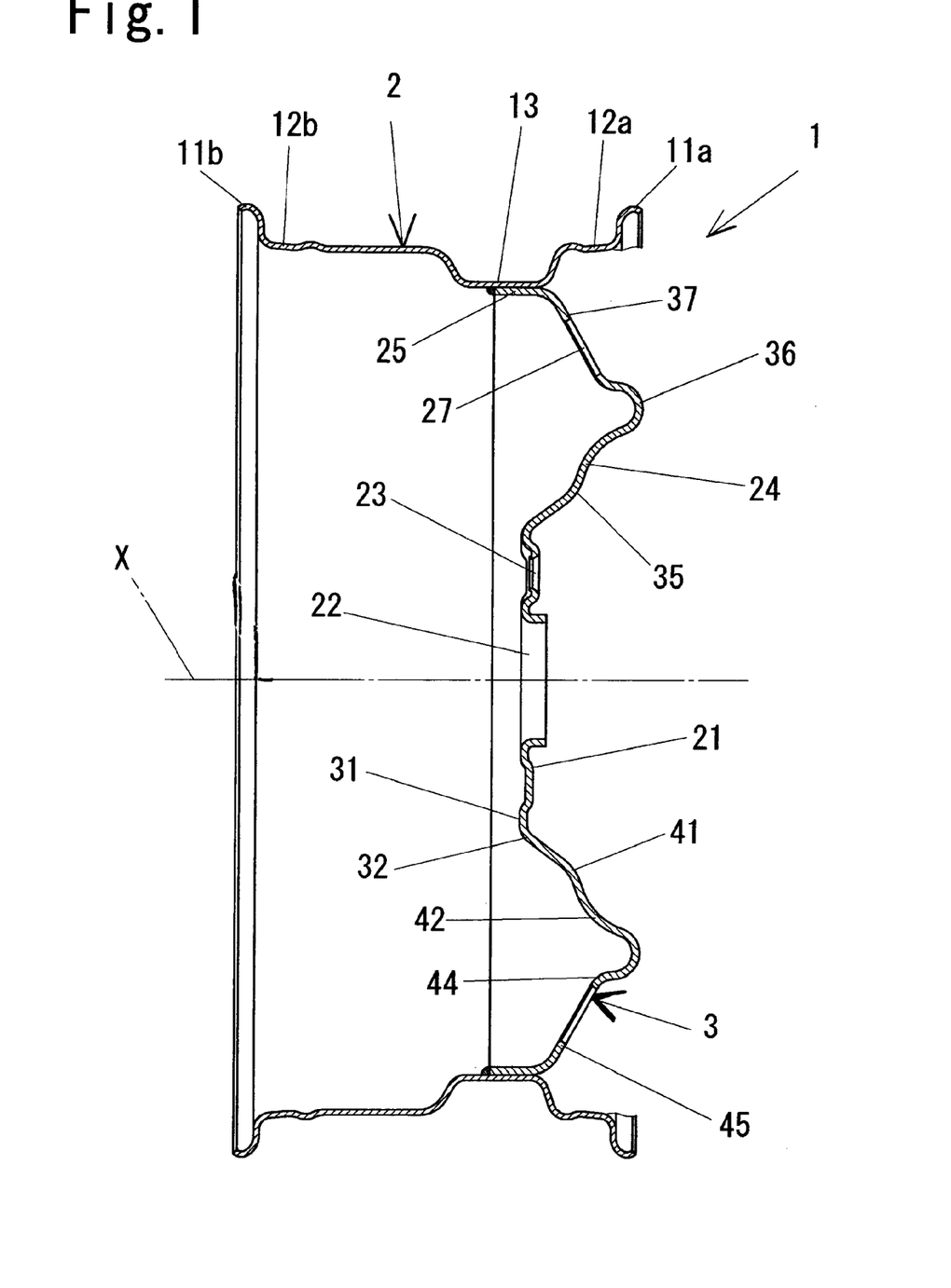
FIG. 1 is a vertical cross-sectional view of an automobile wheel 1 according to an embodiment of the present invention.
Figure 2:
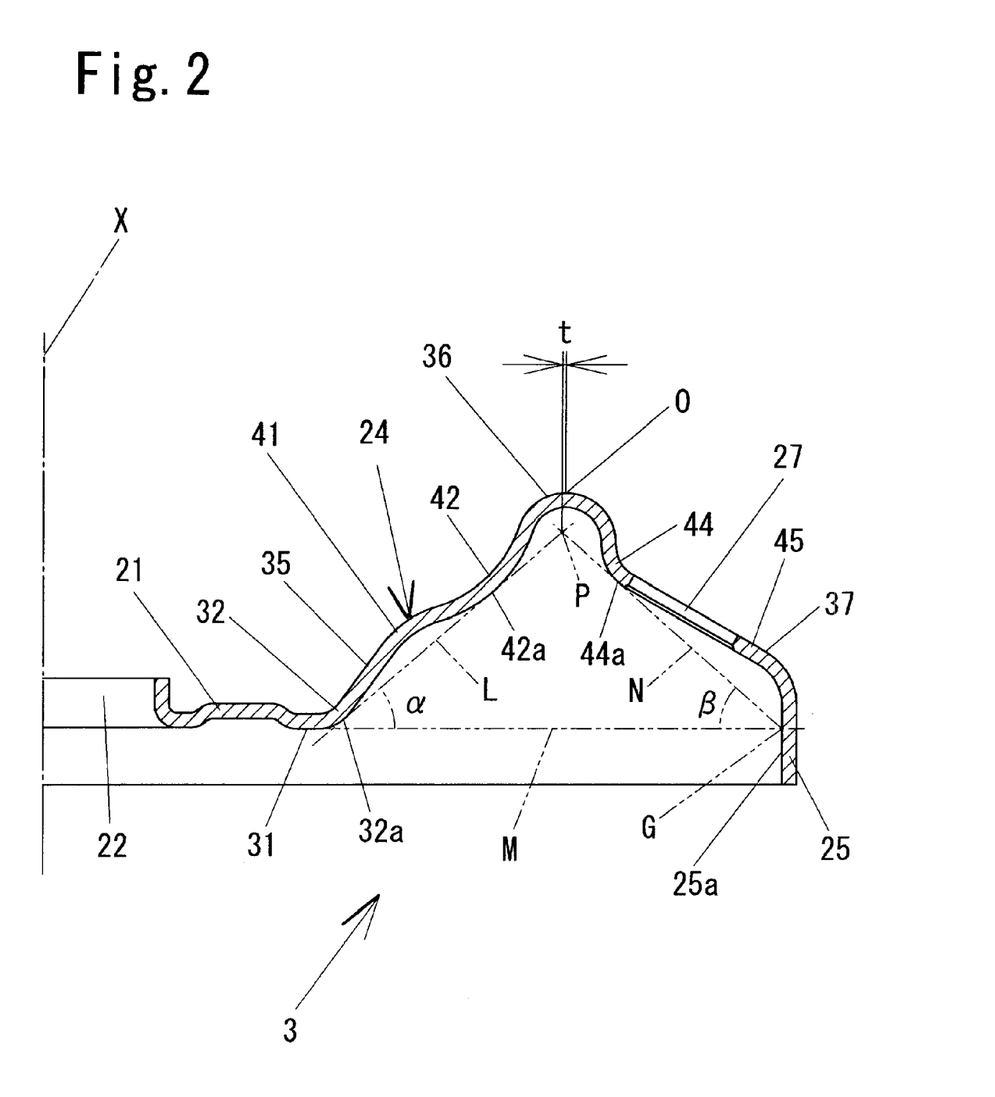
FIG. 2 is an enlarged vertical cross-sectional view of a hat portion 24 of the automobile wheel 1.

FIG. 1 is a vertical cross-sectional view of an automobile wheel 1 according to the embodiment of the present invention. FIG. 2 is an enlarged vertical cross-sectional view of a hat portion 24 of the automobile wheel 1. The automobile wheel 1 is a drop-engaged automobile wheel that includes: a wheel rim 2 that includes a drop portion 13; and a wheel disk 3 that includes a disk flange 25. The disk flange 25 is engaged with an inner circumferential surface of the drop portion 13, and the disk flange 25 and the drop portion 13 are fillet welded together into one piece. The wheel rim 2 and the wheel disk 3 are each formed from a steel flat plate. According to the embodiment of the present invention, the automobile wheel 1 is a two-piece steel wheel.

It should be noted that in the embodiment of the present invention, a direction toward an aesthetic surface side of the wheel disk 3 from its back side is designated as a surface side direction, while a direction opposite to the surface side direction is designated as a back side direction. Also, it should be noted that one radial direction of the automobile wheel 1 toward a central axis X of the automobile wheel 1 is designated as an inward direction, while the other radial direction opposite to the inward direction is designated as an outward direction. Further, it should be noted that a vertical cross section that includes the central axis X is presented on FIG. 1 and FIG. 2, and therefore, a sheet face of FIG. 1 and FIG. 2 is the vertical cross section of the present invention.

The wheel rim 2 is shaped into a cylinder of non-circular cross section. The wheel rim 2 has rim flanges 11a, 11b respectively on a surface-side opening edge and a back-side opening edge of the wheel rim 2. The rim flanges 11a, 11b are designed to support respective side walls of a tire (not shown). The rim flange 11a is formed continuously with a surface-side bead seat 12a, while the rim flange 11b is formed continuously with a back-side bead seat 12b. The surface-side bead seat 12a and the back-side bead seat 12b are designed to allow respective beads of the tire to be seated. The drop portion 13 is provided between the surface-side bead seat 12a and the back-side bead seat 12b and protrudes toward the inward direction. On mounting the tire, the bead of the tire is dropped into the drop portion 13, so that the tire is mounted on the wheel rim 2 easily.

The wheel rim 2 is formed from a rectangular steel flat plate of predetermined dimensions. More specifically, the rectangular steel flat plate is rolled with its shorter sides butting against each other, and the shorter sides are butt joined by upset butt welding to be formed into a cylinder body (not shown). The cylinder body is then subjected to rolling. In the rolling, specific inner and outer molds roll to press the cylinder body therebetween from the inside and the outside of the cylinder body, thereby to form the cylinder body into the wheel rim 2 of a desired shape. The wheel rim 2 is formed from the rectangular steel flat plate by a conventionally known method. Therefore, the conventionally known method is not described any further.

The wheel disk 3 is substantially disk-shaped and includes: a hub mounting portion 21; and the hat portion 24. The hub mounting portion 21 is substantially disk-shaped and has a center opening or a hub hole 22. The hat portion 24 is annular shaped and bulges from an outer circumferential edge of the hub mounting portion 21 toward the surface side direction. The wheel disk 3 also includes the disk flange 25. The disk flange 25 is annular shaped and extends from an outer circumferential edge of the hat portion 24 toward the back side direction. A plurality of bolt holes 23 are drilled through the hub mounting portion 21 at equal intervals circumferentially about the hub hole 22. The bolt holes 23 each have a nut seat (not shown). The hub mounting portion 21, the hat portion 24, and the disk flange 25 are arranged concentrically about the central axis X of the wheel disk 3.

The wheel disk 3 is formed by pressing a circular steel flat plate. More specifically, a substantially square steel flat plate is formed into a saucer-shaped plate that has a center circular recess, and the saucer-shaped plate is then subjected to drawing to form the hub mounting portion 21 and the hat portion 24, and is drilled to form the bolt holes 23 and a plurality of decorative holes 27. Additionally, the saucer-shaped plate is subjected to restriking to form the disk flange 25, thus to complete the forming of the wheel disk 3. These steps of forming the wheel disk 3 are performed in a conventional manner, and therefore the steps are not described any further.

A main part of the present invention is now described.

The wheel disk 3 has a ring-shaped hub mounting surface 31 on a back side surface of the hub mounting portion 21 along the outer circumferential edge of the hub mounting portion 21. When the hub mounting portion 21 is connected to a hub (not shown) of an axle, the hub mounting surface 31 is brought into press contact with the hub. The hub mounting portion 21 has a hub surface rounded portion 32 along its outer circumferential edge. The hub surface rounded portion 32 bends toward the surface side.

The hat portion 24 of the wheel disk 3 includes: an annular hat top circumferential portion 36; an annular inward angled circumferential portion 35; and an annular outward angled circumferential portion 37. The hat top circumferential portion 36 protrudes most toward the surface side direction. The inward angled circumferential portion 35 is provided between the hat top circumferential portion 36 and the hub surface rounded portion 32 of the hub mounting portion 21. The outward angled circumferential portion 37 is provided between the hat top circumferential portion 36 and the disk flange 25. The inward angled circumferential portion 35, the hat top circumferential portion 36, and the outward angled circumferential portion 37 are arranged concentrically about the central axis X.

The inward angled circumferential portion 35 of the hat portion 24 is formed continuously outward from an outer circumferential edge of the hub surface rounded portion 32 of the hub mounting portion 21. The inward angled circumferential portion 35 includes: an inward protruding circumferential portion 41; and an inward recessed circumferential portion 42. The inward protruding circumferential portion 41 protrudes toward the surface side in a curved shape. The inward recessed circumferential portion 42 is formed continuously with an outer circumferential edge of the inward protruding circumferential portion 41 and is recessed toward the back side in a curved shape. The inward angled circumferential portion 35 has a substantially S-shape cross section in which the inward protruding circumferential portion 41 and the inward recessed circumferential portion 42 are continued smoothly. The hat top circumferential portion 36 protrudes from an outer circumferential edge of the inward recessed circumferential portion 42 toward the surface side in a curved shape. The outward angled circumferential portion 37 is formed continuously with an outer circumferential edge of the hat top circumferential portion 36. The outward angled circumferential portion 37 includes: an outward recessed circumferential portion 44; and a descending circumferential portion 45. The outward recessed circumferential portion 44 is recessed toward the back side in a curved shape. The descending circumferential portion 45 is formed continuously with an outer circumferential edge of the outward recessed circumferential portion 44 and is angled toward the back side. The outward recessed circumferential portion 44 and the descending circumferential portion 45 are continued smoothly. The disk flange 25 extends from an outer circumferential edge of the descending circumferential portion 45. The descending circumferential portion 45 is formed with the decorative holes 27 in a circumferential direction at equal intervals.

The hat portion 24 is described in more detail. As shown on the sheet face of FIG. 2, on the vertical cross-section that includes the central axis X of the wheel disk 3, an imaginary inward angled line L is drawn tangential to an inner circumferential surface 32a of the hub surface rounded portion 32 and to an inner circumferential surface 42a of the inward recessed circumferential portion 42 of the inward angled circumferential portion 35. In addition, an imaginary bottom line M is drawn tangential to the hub mounting surface 31 that is formed on the back side surface of the hub mounting portion 21. The imaginary bottom line M extends outward along the hub mounting surface 31. Additionally, an imaginary outward angled line N is drawn tangential to an inner circumferential surface 44a of the outward recessed circumferential portion 44 of the outward angled circumferential portion 37 and runs through an intersection point G. The intersection point G is defined by the imaginary bottom line M and an inner circumferential surface 25a of the disk flange 25 of the wheel disk 3. An imaginary inward angle (α) is formed between the imaginary inward angled line L and the imaginary bottom line M. An imaginary outward angle (β) is formed between the imaginary outward angled line N and the imaginary bottom line M. The imaginary inward angle (α) and the imaginary outward angle (β) are defined to satisfy the following Equation (1):

$$0.8 \leq (\beta)/(\alpha) \leq 1.25 \qquad \text{Equation (1)}$$

An imaginary intersection point P is defined by the imaginary inward angled line L and the imaginary outward angled line N. A radial deviation distance (t) between the imaginary intersection point P and a top point O of the hat top circumferential portion 36 is defined to satisfy the following Equation (2). It should be noted that the deviation distance (t) is an allowable amount of deviation between a radial position of the imaginary intersection point P and a radial position of the top point O, and the allowable amount of deviation is represented as an absolute value. Also, it should be noted that the top point O of the hat top circumferential portion 36 can thus be positioned either radially inward (closer to the central axis X) or radially outward from the imaginary intersection point P.

$$0 \text{ mm} \leq (t) \leq 2.5 \text{ mm} \qquad \text{Equation (2)}$$

According to the embodiment of the present invention, in the hat portion 24, a positional relationship among the hub surface rounded portion 32, the inward recessed circumferential portion 42, the hat top circumferential portion 36, and the outward recessed circumferential portion 44 is determined based on the imaginary inward angled line L and the imaginary outward angled line N. The imaginary inward angled line L is defined by the imaginary inward angle ($\alpha$), while the imaginary outward angled line N is defined by the imaginary outward angle ($\beta$). The imaginary inward angled line L and the imaginary outward angled line N satisfy the Equations (1) and (2). A form of the hat portion 24 is thereby determined.

According to the embodiment of the present invention, the automobile wheel 1 includes the disk wheel 3 that is designed to satisfy the Equations (1) and (2). This allows the automobile wheel 1 to have enhanced stiffness for a bending moment that is applied in the surface side to back side direction with the lateral force, and thus to achieve the functional effects of improving the strength and the driving stability. More specifically, the automobile wheel 1 is capable of efficiently distributing stress that is caused in the hat portion 24 due to the bending moment to sides inward and outward from the top point O of the hat top circumferential portion 36 (the inward angled circumferential portion 35 side and the outward angled circumferential portion 37 side). The hat top circumferential portion 36 has the highest stiffness among the wheel disk 3. Such efficient stress distribution results from the fact that the imaginary inward angle ($\alpha$) that defines the imaginary inward angled line L and the imaginary outward angle ($\beta$) that defines the imaginary outward angled line N satisfy the Equation (1) such that these angles ($\alpha$) and ($\beta$) are equalized as much as possible, thus providing a better stiffness balance between the inward angled circumferential portion 35 side and the outward angled circumferential portion 37 side for the bending moment. In other words, the inward angled circumferential portion 35 that is defined by the imaginary inward angled line L and the outward angled circumferential portion 37 that is defined by the imaginary outward angled line N support and withstand the bending moment in balance therebetween.

The position of the inward recessed circumferential portion 42 of the inward angled circumferential portion 35 and the position of the hub surface rounded portion 32 are determined based on the imaginary inward angled line L. The better stiffness balance improves the effect of minimizing the deformation of the wheel disk 3. This improves the effect of relaxing stress concentration on the inward recessed circumferential portion 42 and on the hub surface rounded portion 32 caused by the bending moment. Thus, the strength of the wheel disk 3 for the bending moment is more effectively enhanced.

The hat top circumferential portion 36 is designed to offer the highest stiffness among the wheel disk 3. Thus, the top point O is defined by the Equation (2) so that the stress is distributed in balance to the inward angled circumferential portion 35 side and to the outward angled circumferential portion 37 side, as described above. This results from the fact that the top point O of the stiffest hat top circumferential portion 36 is positioned where the imaginary inward angled line L and the imaginary outward angled line N are as equal in length as possible, so that the stress is equally distributed to the inward angled circumferential portion 35 and the outward angled circumferential portion 37.

As described above, as the hat portion 24 has the better stiffness balance, the wheel disk 3 has higher stiffness. This improves the effect of minimizing the deformation of the wheel disk 3 caused by the bending moment. Accordingly, the automobile wheel 1 offers higher overall strength and stiffness. In addition, the automobile wheel 1 provides increased driving stability even under lateral loading.

The conventional wheel disk includes: the hub surface rounded portion; and the hat portion, without satisfying the Equations (1) and (2). The hat portion has the inward angled circumferential portion in which the inward protruding circumferential portion and the inward recessed circumferential portion are formed continuously with each other. This causes the hat portion to lose more stiffness balance than the hat portion 24 for the bending moment that is applied in the surface side to back side direction. In contrast to the conventional wheel disk, the wheel disk 3 according to the embodiment of the present invention is designed to satisfy the Equations (1) and (2). Therefore, the hat portion 24 exhibits a better stiffness balance, and thus the wheel disk 3 has higher stiffness. This improves the functional effect of relaxing stress concentration on the hub surface rounded portion 32 and on the inward recessed circumferential portion 42.

A rotary bending fatigue test (JIS D4103) was performed for the automobile wheel 1 according to the embodiment of the present invention. The test results are now described below.

Figure 5:
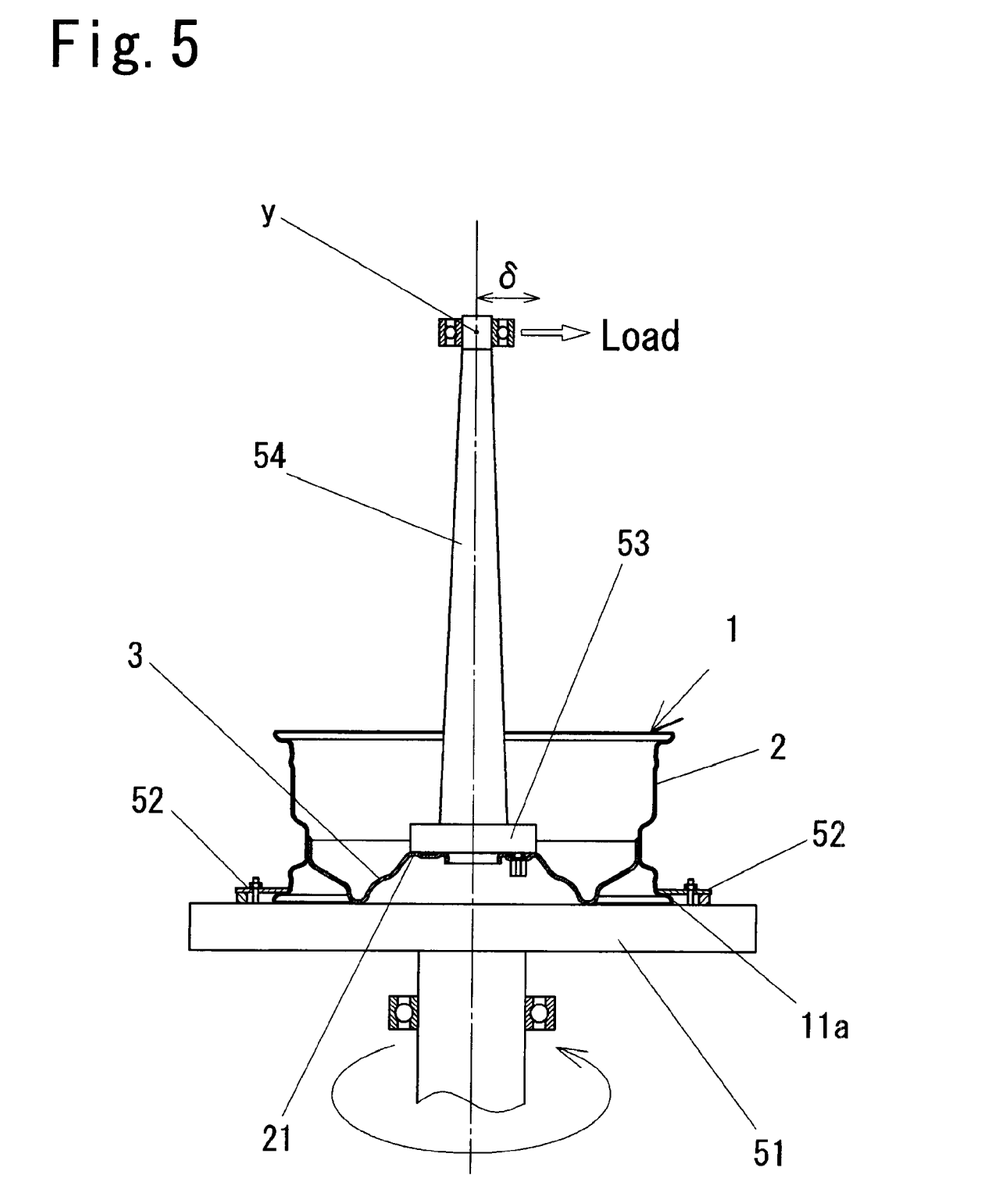
FIG. 5 illustrates how to measure displacement (δ) in the rotary bending fatigue test.

In the embodiment of the present invention, the rotary bending fatigue test is intended to evaluate the stiffness of the automobile wheel 1. More specifically, the rotary bending fatigue test was performed according to JIS D4103 rules. In the test, while the automobile wheel 1 was rotated at a constant speed, a constant bending moment was applied to the hub mounting surface 21 of the automobile wheel 1. In the embodiment of the present invention, a load was imposed on a point (hereinafter referred to as "pivot point") (y) to provide a bending moment to the wheel disk 3 in order to measure displacement (deformation) ($\delta$) of the pivot point (y) in the rotary bending fatigue test. As shown in FIG. 5, the surface-side flange 11a of the automobile wheel 1 is fixed to a rotational disk 51 on its upper surface with a fastener 52. An attachment disk 53 is provided at one end of a load arm 54. The attachment disk 53 is connected to the hub mounting portion 21 from the back side of the automobile wheel 1 to attach the load arm 54 to the automobile wheel 1. After setting the automobile wheel 1 in the manner described, a horizontal load was imposed on the other end of the load arm 54 to provide a bending moment to the wheel disk 3, while the rotational disk 51 was rotated at a constant speed. Then, the displacement ($\delta$) of the pivot point (y) in a horizontal direction at the other end of the load arm 54 was measured. The horizontal displacement ($\delta$) is mainly dependent on the stiffness of the wheel disk 3. Therefore, a measurement of the displacement ($\delta$) is an indicator to evaluate the stiffness of the wheel disk 3 (i.e. the stiffness of the automobile wheel 1).

Figure 3:
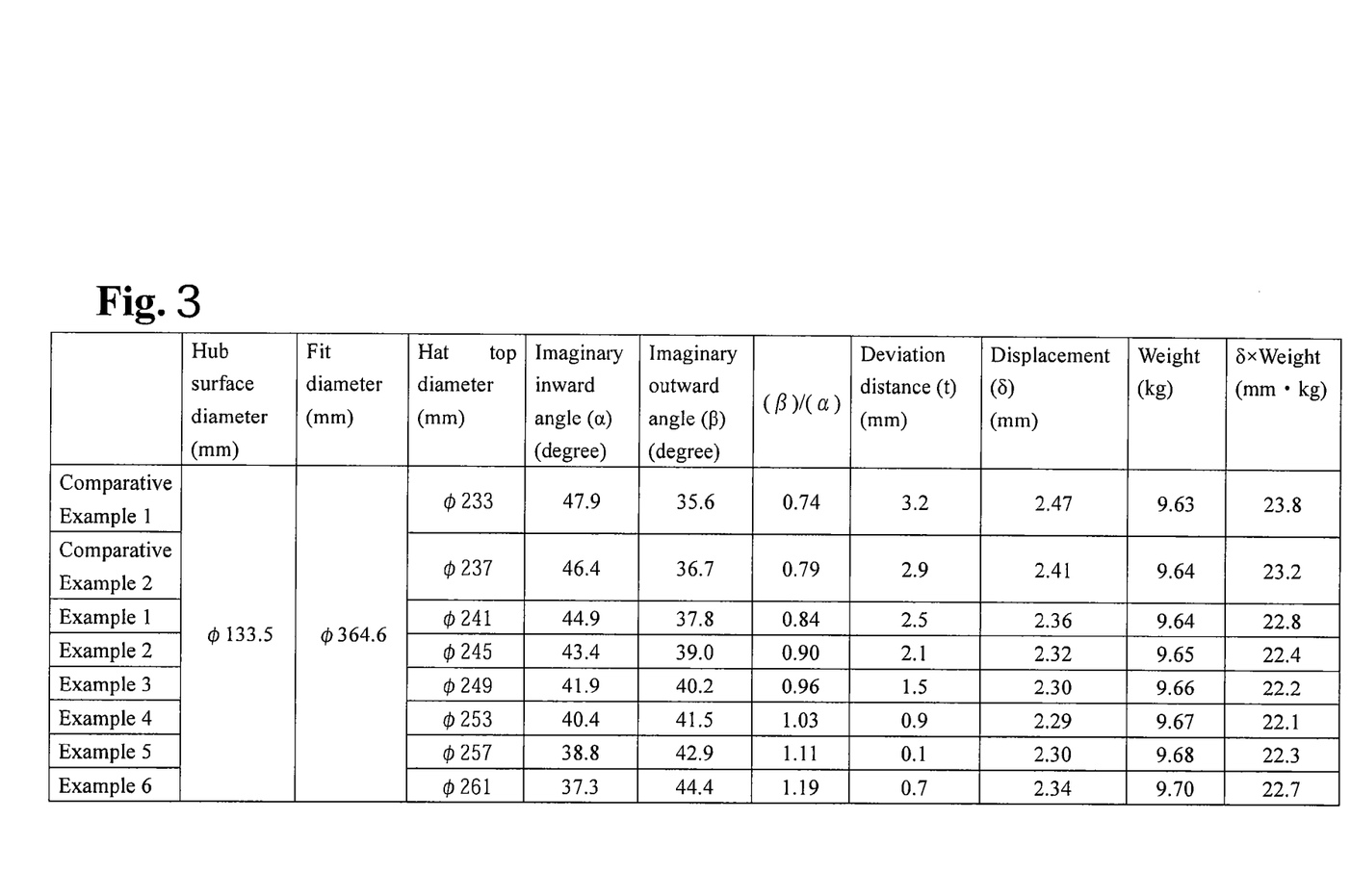
FIG. 3 is a chart illustrating numerical values of an imaginary inward angle (α), of an imaginary outward angle (β), and of a deviation distance (t), and measurement results of a rotary bending fatigue test in Examples 1 to 6 and Comparative Examples 1 and 2.

As shown in FIG. 3, in the rotary bending fatigue test, six types of the automobile wheel 1 are presented as Examples 1 to 6. These six types of the automobile wheel 1 satisfy the Equations (1) and (2). In addition, two other types of the automobile wheel are also presented as Comparative Examples 1 and 2. These two types of the automobile wheel do not satisfy the Equations (1) and (2). The same rotary bending fatigue test was performed for the Comparative Examples 1 and 2.

In the Examples 1 to 6, a rim diameter is 16 inches, an outer diameter of the hub mounting portion 21 of the wheel disk 3 is 133.5 mm, and an outer diameter (fit diameter) of the disk flange 25 is 364.6 mm. As shown in FIG. 3, in each of the Examples 1 to 6, the imaginary inward angle ($\alpha$) and the imaginary outward angle ($\beta$) are preset to satisfy the Equation (1), while the radial deviation distance (t) is preset to satisfy the Equation (2). The radial deviation distance (t) is defined between the imaginary intersection point P and the top point O of the hat top circumferential portion 36. The imaginary intersection point P is defined by the imaginary inward angled line L and the imaginary outward angled line N. The form of the hat portion 24 is determined based on the imaginary inward angle ($\alpha$), the imaginary outward angle ($\beta$), and the deviation distance (t). In any of the Examples 1 to 6, the wheel rim 2 is as thick as the wheel disk 3. The Examples 1 to 6 are all the same except the form of the hat portion 24 to which changes or modifications are made within the scope of the present invention. Therefore, in the Examples 1 to 6, the same components are represented by the same reference numerals.

In the Comparative Examples 1 and 2, the automobile wheel has the same construction as the automobile wheel 1 according to the embodiment of the present invention, except that the form of the hat portion does not to satisfy the Equations (1) and (2). The hat portion includes: an inward angled circumferential surface that has a substantially S-shape cross section; a hat top circumferential portion that is curved toward the surface side direction; and an outward angled circumferential surface. Also, in the Comparative Examples 1 and 2, a rim diameter, an outer diameter of the hub mounting portion, an outer diameter of the disk flange, and a thickness of the wheel rim and the wheel disk are all equal to those of the automobile wheel 1 according to the embodiment of the present invention.

Figure 4:
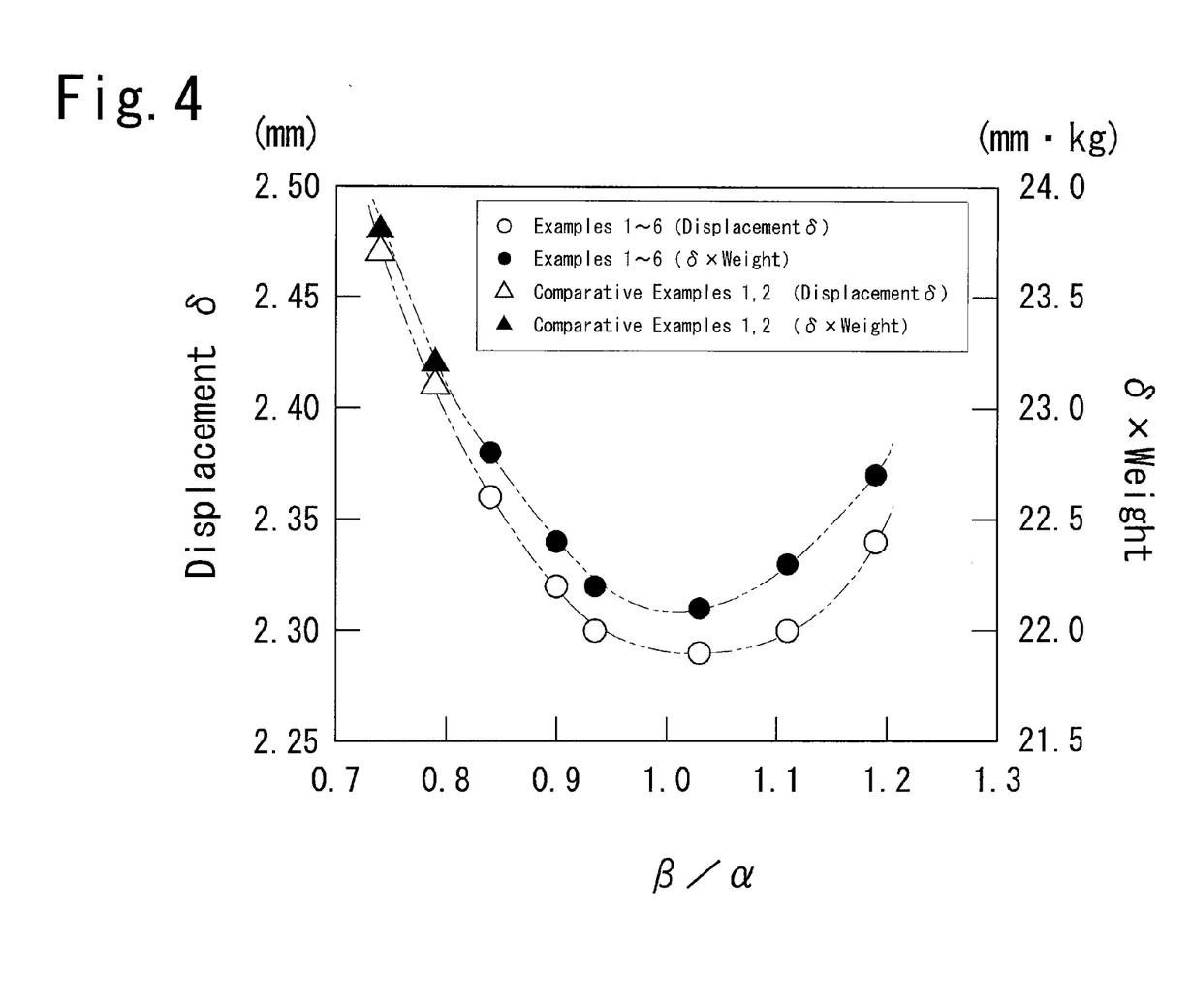
FIG. 4 is a graph illustrating the measurement results of the rotary bending fatigue test in the Examples 1 to 6 and the Comparative Examples 1 and 2.

The test results from the Examples 1 to 6 and the Comparative Examples 1 and 2 are shown in FIG. 3 and FIG. 4. In the rotary bending fatigue test, a constant bending moment of 1.67 kN·m was provided to measure the displacement (deformation) ($\delta$) of the pivot point (y) (See FIG. 5).

In the Examples 1 to 6 and the Comparative Examples 1 and 2, each hat portion has a different form. Therefore, FIG. 3 also shows a hat top diameter of the top point O of each hat top circumferential portion about the central axis X. In addition, the automobile wheel 1 weighs differently depending on the form of the hat portion. Therefore, the weight was also measured. There is a demand for stiffer (stronger) and lighter automobile wheels. Therefore, a product of the displacement ($\delta$) and the weight is represented as an indicator to determine the effectiveness of improvement in stiffness and weight reduction.

The results of the rotary bending fatigue test show that the displacement ($\delta$) of the pivot point (y) is smaller in the Examples 1 to 6 than in the Comparative Examples 1 and 2. Especially, the displacement ($\delta$) is smallest in the Example 4. This clearly indicates that the wheel disk 3 has higher stiffness in the Examples 1 to 6, and this higher stiffness is obtained by satisfying the Equations (1) and (2). To be more specific, in the Examples 1 to 6, the stress that is caused due to the bending moment is distributed in balance to the sides inward and outward from the top point O of the hat portion 24 (the inward angled circumferential portion 35 side and the outward angled circumferential portion 37 side). Thus, the hat portion 24 exhibits a better stiffness balance, and the wheel disk 3 has higher stiffness. In the Example 4, a ratio ($\beta$)/($\alpha$) is closest to 1. Thus, the hat portion 24 exhibits the best stiffness balance, and the wheel disk 3 has further higher stiffness. This indicates that the ratio ($\beta$)/($\alpha$) is preferably as close to 1 as possible. In other words, a triangle that is defined by the imaginary inward angled line L, the imaginary bottom line M, and the imaginary outward angled line N is preferably as similar to an isosceles triangle as possible.

In the Examples 1 to 6 and the Comparative Examples 1 and 2, the weight of the automobile wheel 1 increases as the hat top diameter is larger. Thus, the weight is greater in the Examples 1 to 6 than in the Comparative Examples 1 and 2. However, the product of the displacement ($\delta$) and the weight is smaller in the Examples 1 to 6 than in the Comparative Examples 1 and 2, and is smallest in the Example 4. This indicates that the Examples 1 to 6 strike a better balance between the improvement in stiffness and the weight reduction than the Comparative Examples 1 and 2. Especially, the Example 4 strikes the best balance between the improvement in stiffness and the weight reduction.

FIG. 4 shows a tendency that as the ratio ($\beta$)/($\alpha$) exceeds or drops below 1, the displacement ($\delta$) increases and the product of the displacement ($\delta$) and the weight increases. If the ratio ($\beta$)/($\alpha$) is smaller than 0.8 or larger than 1.25, this tendency is observed to be stronger. This clearly indicates that the automobile wheel 1 of the Examples 1 to 6, which satisfies the Equations (1) and (2), produces the higher functional effects of the present invention.

As described above, based on the test results from the Examples 1 to 6, the ratio ($\beta$)/($\alpha$) is preferably as closest to 1 as possible. Therefore, preferably the Equation (1) is expressed as below:

$$0.84 \leq (\beta)/(\alpha) \leq 1.20.$$

More preferably, the Equation (1) is expressed as below:

$$0.9 \leq (\beta)/(\alpha) \leq 1.11.$$

Furthermore preferably, the Equation (1) is expressed as below:

$$0.95 \leq (\beta)/(\alpha) \leq 1.05.$$

The deviation distance (t) satisfies the Equation (2), thereby to achieve the functional effects of the present invention. However, it is conceivable that when the deviation distance (t) is as closest to 0 as possible, the effect of the better stiffness balance between the sides inward and outward from the top point P is more easily produced. Therefore, preferably the Equation (2) is expressed as follows:

$$0 \text{ mm} \leq (t) \leq 1.5 \text{ mm}.$$

It should be apparent that the present invention is not limited to the aforementioned embodiment, and a variety of changes and modifications may be made to the constructions described in the embodiment within the scope of the invention. For example, an automobile wheel may be formed from a flat plate of aluminum alloy or magnesium alloy, and such automobile wheel may also achieve the same functional effect that is achieved by the automobile wheel made of steel.

DESCRIPTION OF REFERENCE NUMERALS AND SYMBOLS

1: automobile wheel
2: wheel rim
3: wheel disk
21: hub mounting portion 24: hat portion
25: disk flange
25a: inner peripheral surface (of disk flange 25)
31: hub mounting surface (back side surface of hub mounting portion 21)
32: hub surface rounded portion
32a: inner circumferential surface (of hub surface rounded portion 32)
35: inward angled circumferential portion
36: hat top circumferential portion
37: outward angled circumferential portion
41: inward protruding circumferential portion
42: inward recessed circumferential portion
42a: inner circumferential surface (of inward recessed circumferential portion 42)
44: outward recessed circumferential portion
44a: inner circumferential surface (of outward recessed circumferential portion 44)
G: intersection point (of imaginary bottom line M and disk flange 25)
L: imaginary inward angled line
M: imaginary bottom line
N: imaginary outward angled line
O: top point (of hat top circumferential portion 36)
P: imaginary intersection point
X: central axis
t: deviation distance
α: imaginary inward angle
β: imaginary outward angle

What is claimed is:

1. An automobile wheel comprising: a wheel disk; and a substantially cylindrical wheel rim, in which the wheel disk includes: a substantially disk-shaped hub mounting portion that is connected to a hub of an axle; a hat portion that bulges outward from the hub mounting portion toward a surface side direction; and a disk flange that extends from an outer circumferential edge of the hat portion toward a back side direction, and the wheel disk is engaged with an inner circumferential surface of the wheel rim to join the wheel disk and the wheel rim together, wherein the hat portion comprises:

an inward angled circumferential portion that has a substantially S-shape cross section comprising:
an inward protruding circumferential portion; and
an inward recessed circumferential portion, the inward protruding circumferential portion being formed continuously with an outer circumferential edge of a hub surface rounded portion and protruding toward a surface side in a curved shape, the hub surface rounded portion being formed along an outer circumferential edge of the hub mounting portion and bending toward the surface side, and the inward recessed circumferential portion being formed continuously with an outer circumferential edge of the inward protruding circumferential portion and being recessed toward a back side in a curved shape;

a hat top circumferential portion that is formed continuously with an outer circumferential edge of the inward recessed circumferential portion of the inward angled circumferential portion and that protrudes toward the surface side direction in a curved shape; and an outward angled circumferential portion that includes an outward recessed circumferential portion that is formed continuously with an outer circumferential edge of the hat top circumferential portion and that is recessed toward the back side in a curved shape;

wherein the inward angled circumferential portion, the hat top circumferential portion, and the outward angled circumferential portion being arranged concentrically, in which on a vertical cross section that includes a central axis of the wheel disk, when an imaginary inward angle (α) is formed between an imaginary inward angled line L and an imaginary bottom line M, and an imaginary outward angle (β) is formed between an imaginary outward angled line N and the imaginary bottom line M, where the imaginary inward angled line L is tangential to an inner circumferential surface of the hub surface rounded portion and to an inner circumferential surface of the inward recessed circumferential portion of the inward angled circumferential portion, the imaginary bottom line M extends outward along a back side surface of the hub mounting portion, and the imaginary outward angled line N is tangential to an inner circumferential surface of the outward recessed circumferential portion of the outward angled circumferential portion and runs through an intersection point G of the imaginary bottom line M and an inner circumferential surface of the disk flange, the imaginary inward angle (α) and the imaginary outward angle (β) satisfy an equation:

$$0.95 \leq (\beta)/(\alpha) \leq 1.05,$$

and when a radial deviation distance (t) is defined between an imaginary intersection point P and a top point O of the hat top circumferential portion, where the imaginary intersection point P is defined by the imaginary inward angled line L and the imaginary outward angled line N, the deviation distance (t) satisfies an equation:

$$0 \text{ mm} \leq (t) \leq 2.5 \text{ mm}.$$

* * * * *